Feb. 7, 1933.  H. J. SMITH  1,896,207
CONDITION CONTROL APPARATUS
Filed Feb. 14, 1931  7 Sheets-Sheet 1
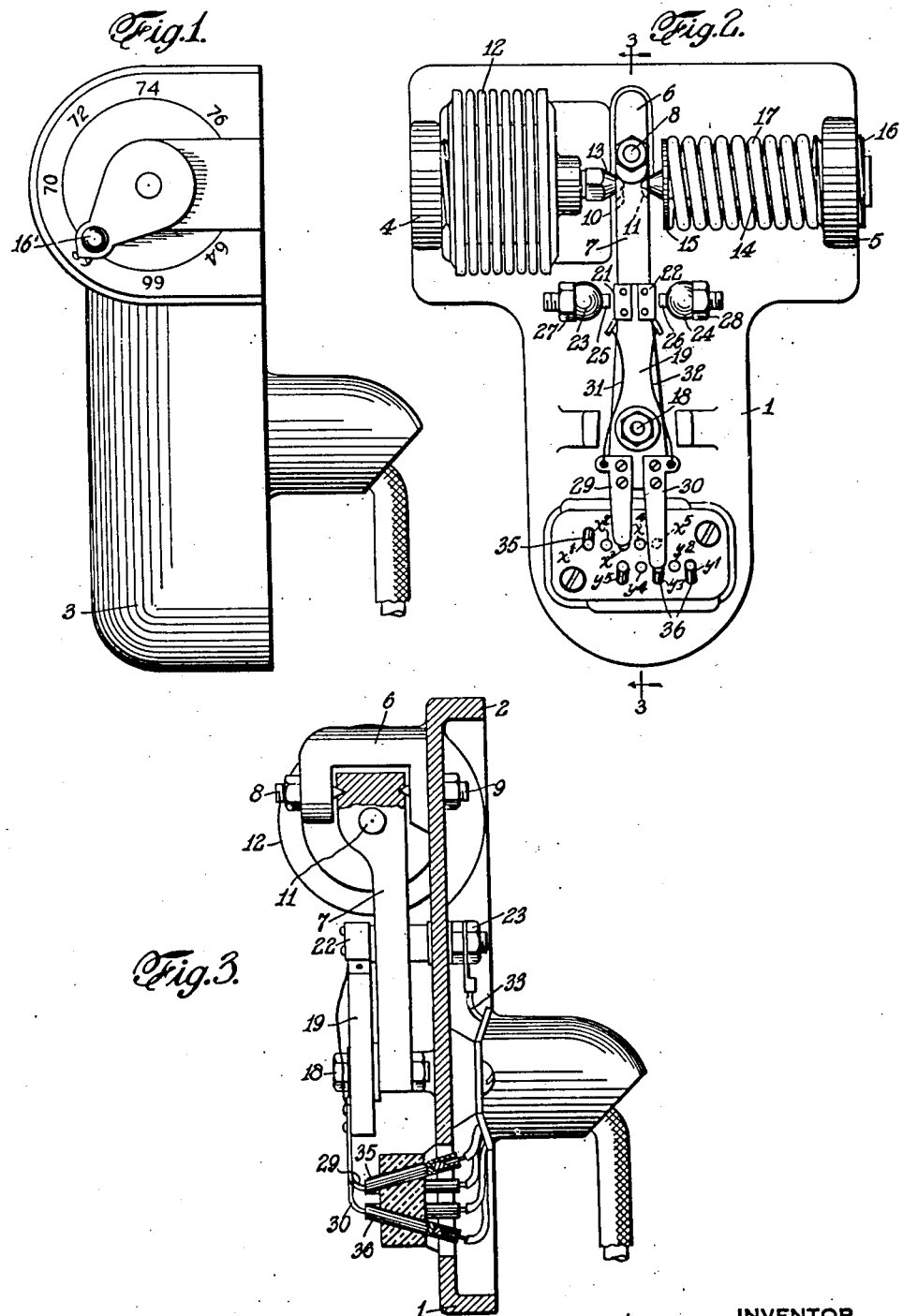
INVENTOR
Hazor J. Smith
BY
Wm. S. Pritchard
ATTORNEY

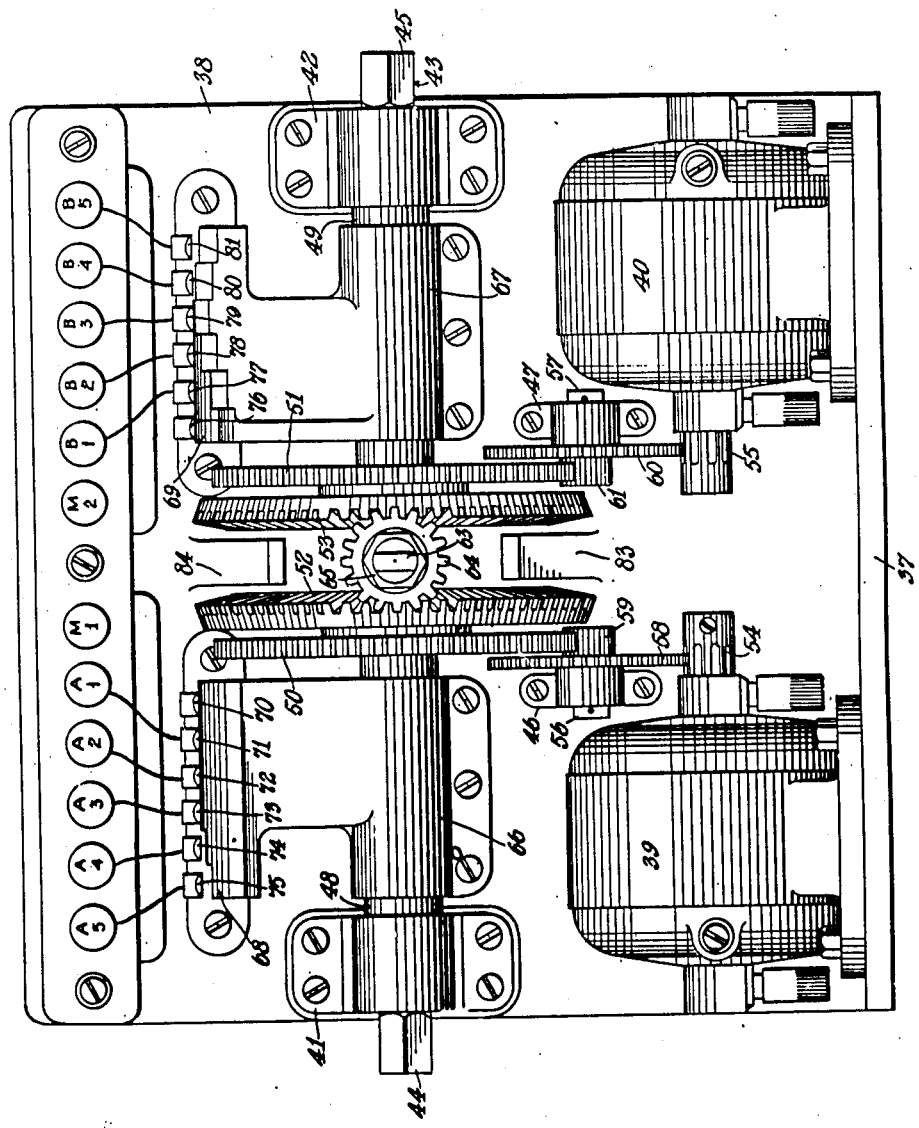

Feb. 7, 1933.     H. J. SMITH     1,896,207
CONDITION CONTROL APPARATUS
Filed Feb. 14, 1931     7 Sheets-Sheet 3
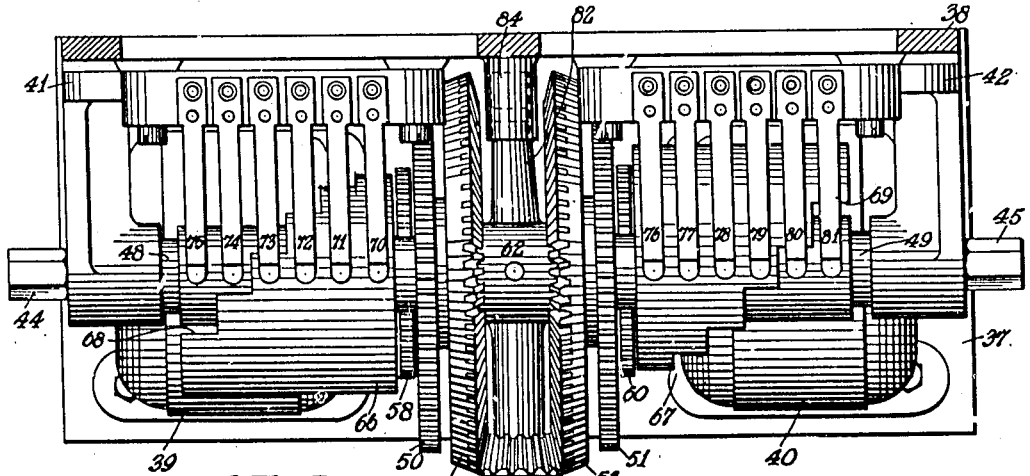

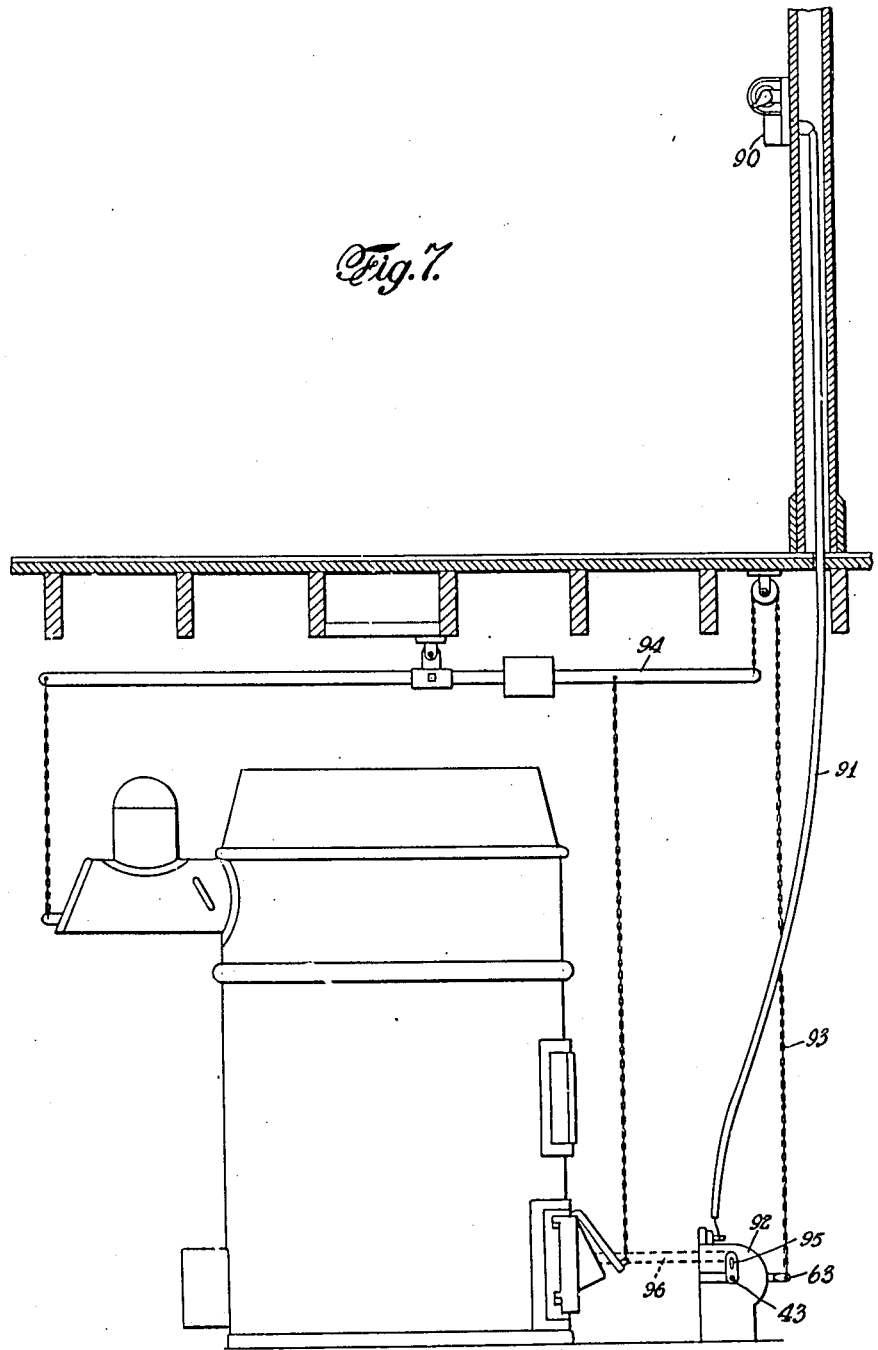

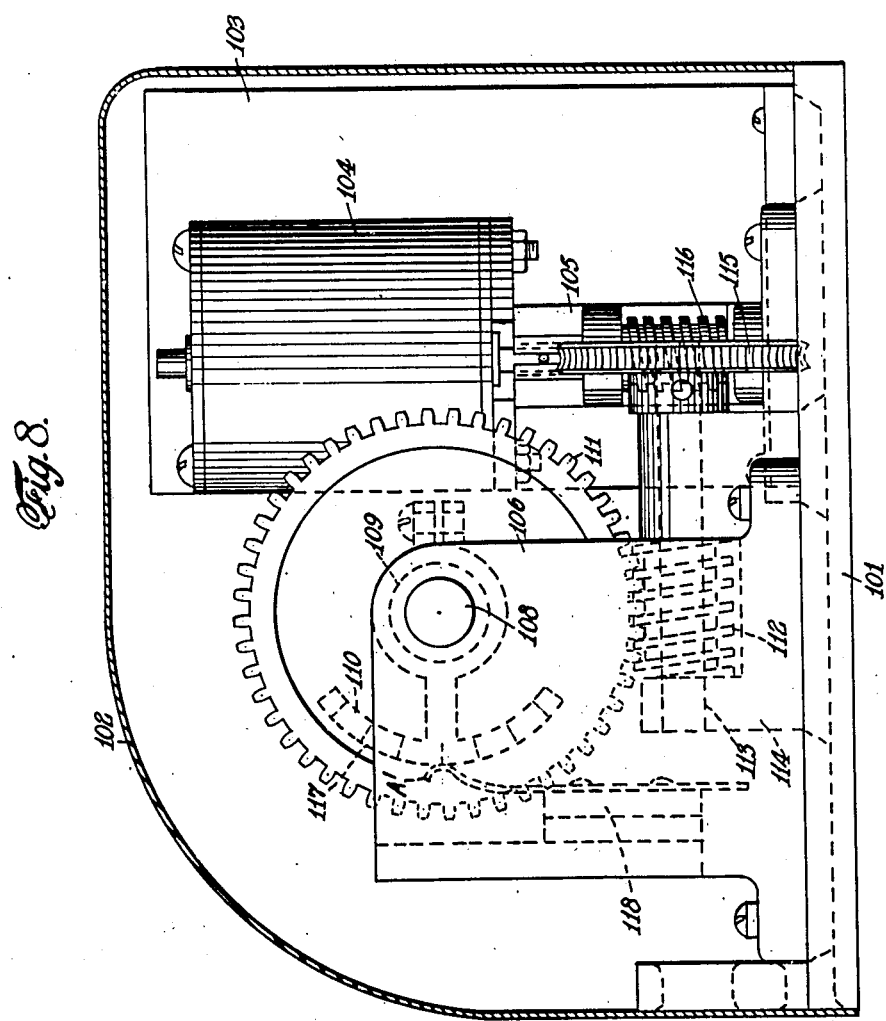

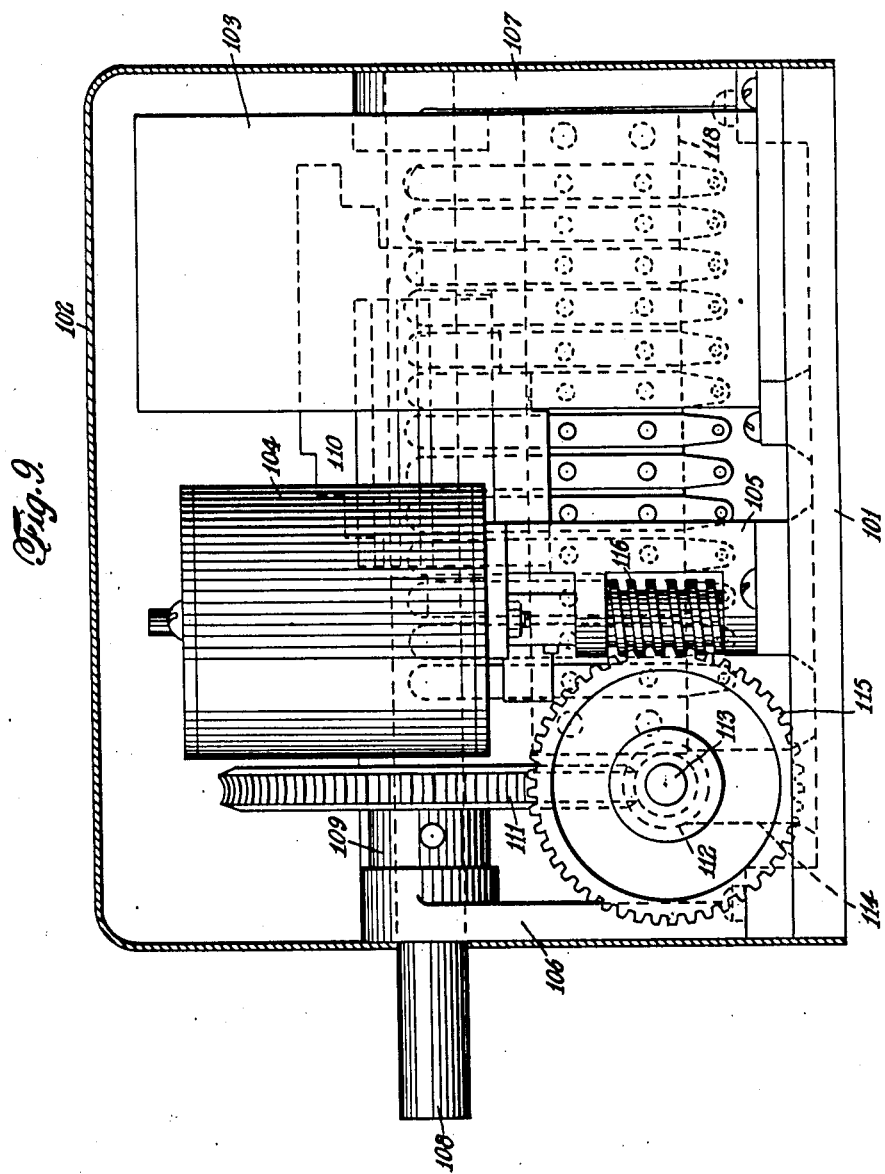

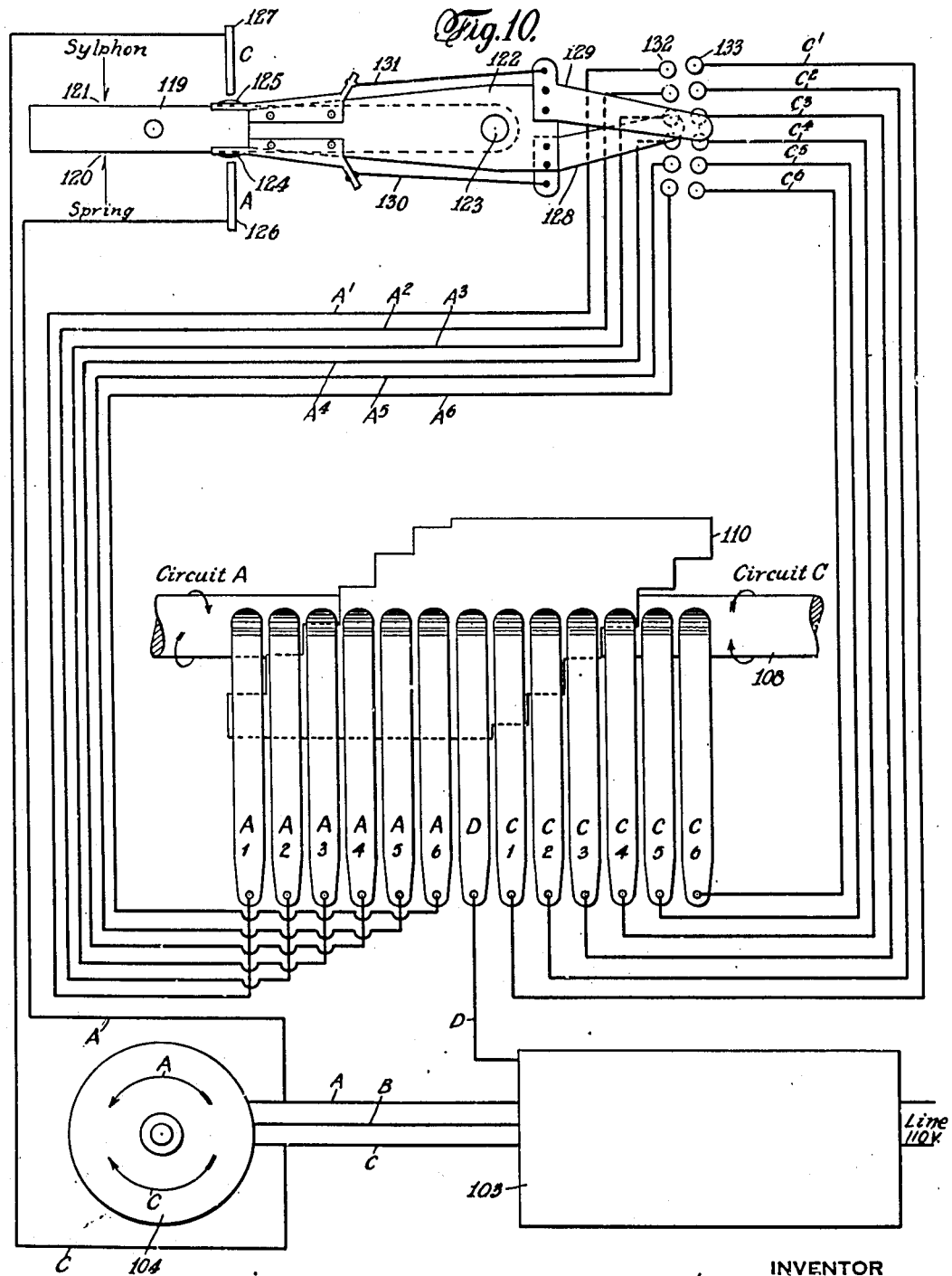

Patented Feb. 7, 1933

1,896,207

UNITED STATES PATENT OFFICE

HAZOR J. SMITH, OF SPRINGFIELD, MASSACHUSETTS, ASSIGNOR TO SUPERSTAT COMPANY, OF SPRINGFIELD, MASSACHUSETTS, A CORPORATION OF MASSACHUSETTS

CONDITION CONTROL APPARATUS

Application filed February 14, 1931. Serial No. 515,787.

This invention relates to an apparatus for automatically controlling temperatures and/or pressures and furnishes a means for directly varying the supply of heat or pressure to compensate for wide or narrow fluctuations in temperature or pressure.

This invention provides means for maintaining substantially constant predetermined pressure as, for instance, in a steam boiler where constant steam pressure is desired. The device is adapted to compensate for large drops in pressure due to excess use of steam or to compensate for slight variations in pressure where the amount of steam consumed is less.

This invention is also useful in maintaining substantially constant temperatures in apparatus such as calender rolls for rubber mills. It provides a means for operating the valves which control the heating and cooling mediums. It permits the valves to be opened wide to compensate for abnormal variations in temperature, and gradually closed as the temperature reaches the predetermined point. It also opens or closes the valves so as to substantially maintain the temperatures balanced under normal working conditions.

This invention also provides a remote control for various types of apparatus, such for instance as the ventilators in foundries or die casting plants, wherein the temperature varies according to the amount of molten metal present and the temperature of the outside atmosphere. By means of this invention, the ventilators may be opened or closed to maintain the desired temperature conditions.

This invention is particularly adapted for automatically regulating the temperature of rooms by regulating the drafts and fuel supply of house-heating apparatus whereby the proper rate of combustion necessary to furnish the desired temperature may be maintained. In view of its particular adaptability for this purpose, this invention is illustrated and described in connection with a house-heating apparatus. It is to be understood, however, that my invention is in no wise limited in its breadth and scope to the particular use described.

Heat control devices have heretofore been used consisting of means for automatically controlling the temperature by controlling the rate of combustion. These control devices generally consisted of heat responsive means which were operatively connected to and adapted to actuate the draft control means and/or the fuel supply means of the heater. These devices, in the event more heat was required, instantly opened the draft control means and/or the fuel supply to their maximum limits, and likewise, when the desired temperature was reached, these means were instantly and completely closed. For house-heating purposes these thermostats are generally adjusted between 68 and 70°. They are so devised that when the temperature drops below 68° the draft control means and/or fuel supply is opened to the maximum limits, whereas when the temperature arises above 70°, the draft control means and/or fuel supply is completely closed. The operation of these devices is exactly the same whether it is desired to raise the temperature 2° or 20°. The result thereof is that while set to operate within a temperature range of 2°, as a matter of fact, the variation in temperature is often as wide as 10°. It is obvious that, since the draft and/or fuel supply is completely closed at the time when the room is at the predetermined temperature, and since the heating device is not sufficiently flexible to respond instantly to the opening of the drafts or the fuel supply, the temperature of the room will continue to drop, at times going as low as 64 or 65° before there is any appreciable increase in temperature. Likewise when the maximum temperature of 70° is reached, and the drafts and/or fuel supply is completely closed, the coal will continue to burn for a time at approximately the same rate as when the drafts are open, and heat will continue to be supplied at a greater rate than desired. This will cause the temperature of the room to increase beyond the maximum temperature desired, sometimes as high as 74 to 75°, since there is no way of shutting off the heat supply, even though the drafts are closed and the fuel supply shut off.

By means of the apparatus hereinafter described and constituting one specific modification of this invention, the elements governing the rate of combustion may be so controlled that they may be opened from the closed position or any other position to the maximum open position, should the conditions require it, and gradually closed as the temperature approaches the desired degree. Though the means controlling the rate of combustion may be opened to the maximum limits when the temperature of the room requires it, as for instance in increasing the temperature from night temperature to day temperature, in most instances, and particularly when the difference in temperature is small, these means are only modulated to the extent necessary to maintain the temperature at the desired degree.

It is therefore an object of this invention to provide a means for automatically substantially maintaining predetermined temperatures.

Another object of this invention is to provide a heat controlled mechanism to gradually operate the elements necessary to increase or decrease the rate of combustion to the extent necessary to raise the temperature or pressure and to maintain it at the predetermined degree.

A further object of this invention is to provide a heat control mechanism which will control the rate of combustion by modulating or gradually opening and closing drafts and fuel supply means to any predetermined position up to the maximum limit as determined by the difference in temperature desired and the actual temperature.

Other objects will appear from the following description, appended claims and accompanying drawings showing one modification of an apparatus constructed in accordance with the principles of this invention.

Figure 1 is a side elevation of the control unit.

Figure 2 is a front view of the control unit with the covering removed.

Figure 3 is a section taken on lines 3—3 of Figure 2.

Figure 4 is a front elevation of the motor mechanism and its appurtenant parts for operating the combustion control means with the casing removed.

Figure 5 is a top plan view of the mechanism illustrated in Figure 4.

Figure 6 is a side elevation of the mechanism illustrated in Figure 4 as viewed from the right.

Figure 7 is a diagrammatic illustration of the apparatus constituting this invention in combination with a coal heating system.

Figure 8 is a side elevation of a modified form of my invention, with the side of the casing removed.

Figure 9 is a front elevation of my modified construction shown in Figure 8.

Figure 10 is a wiring diagram of the modified device shown in Figures 8 and 9.

The invention, as exemplified by the drawings, contemplates an apparatus for controlling the rate of combustion in a suitable heating system, whereby the temperature of the room served by the heating system is maintained at any predetermined degree, such as, for instance, 68° F. In accordance with the principles of this invention, a control unit including a heat responsive element controlling a motor circuit is provided, whereby, when said circuit is closed, the elements, such as the drafts and/or the fuel supply, are opened, closed or maintained at the necessary position to increase, decrease or maintain the rate of combustion to produce the predetermined temperature or pressure.

The apparatus is so constructed that the means controlling the combustion are gradually opened and/or closed, the maximum opening being obtained only when it is necessary to obtain a rate of combustion to raise the temperature of the heating system a substantial amount. When the variations in temperature are small, the elements governing the rate of combustion are opened or closed to the degree necessary to maintain the desired temperature. In other words the device exercises a modulated or balanced control of the combustion responsive to changes in temperature.

The apparatus, as is apparent from the preceding, consists of a control unit and a motor mechanism, said motor mechanism through suitable transmissions controlling the elements governing the rate of combustion in the heating system.

Referring to the drawings, Figures 1 to 3 inclusive illustrate the control mechanism. A base 1 is provided with a peripheral flange 2 and a cover 3. Mounted on the base 1 and preferably integral therewith are flanges 4 and 5. Also mounted on the base is a bracket 6. Lever 7 is pivotally supported in the bracket 6 by means of the adjustable pivot pins 8 and 9. The lever 7 has depressions 10 and 11 on either side thereof. The base of a heat responsive element 12 is mounted on the flange 4. This element consists of a charged sylphon bellows. As the details of construction of sylphon bellows are well known, no further description thereof is necessary. The sylphon bellows 12 is provided at its other end with a conical pin 13 adapted to seat in the depression 10 on the lever 7. A threaded bushing 16 is mounted in the bracket 5. A pin 14 is mounted slidably in the bushing 16. The pin 14 is provided with the conical end adapted to engage the depression 11 on the lever 7. The pin 14 is provided with a washer 15. A spring 17 is held between the washer 15 and the bushing 16 and tends to urge the pin 14 forward into engagement with the lever 7. The spring 17 tends to counter-balance or oppose the action of the sylphon bellows 12. The bushing 16 is provided with an indicator handle 16'. The casing 3 is provided with a dial marked off to indicate degrees. The rotation of the handle 16' advances or retracts the bushing 16 and increases or decreases the tension on the spring 17, thereby varying the operative effect of the sylphon bellows 12.

In place of the pin 14 and the spring 17 I may substitute a bellows, similar to 12, mounted on a threaded base adapted to be turned in the threaded bushing 16. This sylphon bellows I may fill with air or other suitable gas to a predetermined degree through a suitable valve, such as a tire valve, thereby providing a different type of resilient means to oppose the action of the bellows 12.

Pivoted on the lower end of the lever 7 at 18 is a second lever 19, preferably made from insulating material. The lever 19 is provided with metal contact members 21 and 22. Mounted on the base 1 by means of the binding posts 23 and 24 are the adjustable contacts 25 and 26. The adjustment of these contacts is effected by means of the nuts 27 and 28. The contact 25 is adapted to contact with the contact 21 on the lever 19 and the contact 26 is adapted to contact with the contact 22 on the lever 19. The contacts 21, 25 and 22, 26 comprise a double-throw switch constituting in effect a pair of reversing switches. The lower end of the lever 19 is provided with brushes 29 and 30. The brush 29 is connected through the lead 31 with the contact member 21. The brush 30 is connected through a lead 32 with the contact member 22. The binding posts 23 and 24 are connected to the motor mechanism by means of a pair of wires 33 and 34, one of which is shown in Figure 3. Mounted on the lower end of the base 1 are two series of contact members 35 and 36. The contact members 35 are adapted to be engaged by the brush, 29 whereas the contact members 36 are adapted to be engaged by the brush 30. The contact 29 with the series of contacts 35 and the contact 30 with the series of contacts 36 constitute step-by-step connecting switches. Each element of the contact members 35 and 36 is connected by wires to the motor mechanism afterwards to be described.

The motor unit is illustrated in Figures 4, 5 and 6. It consists of a base 37 to which is integrally connected an upright panel 38. Bolted to the base 37 are electric motors 39 and 40. The upright panel 38 is provided with two brackets 41 and 42. Mounted on the brackets 41 and 42 is an oscillating shaft or spindle 43. This spindle is provided with hexagonal ends 44 and 45 to which additional operating arms may be attached. The upright panel 38 is also provided with brackets 46 and 47. Loosely mounted on the spindle 43 are gears 50, 51, 52 and 53. These gears are free to rotate on the shaft 43. The beveled gears 52 and 53 are secured to the gears 50 and 51 respectively so that gears 50 and 52 rotate in unison, whereas the gears 51 and 53 rotate in unison. The motors 39 and 40 are provided with gears 54 and 55 respectively. Mounted on the brackets 46 and 47 by means of the studs 56 and 57 are the gears 58, 59, 60 and 61. The gears 58 and 59 are adapted to rotate in unison, whereas, the gears 60 and 61 are adapted to rotate in unison. The gear 58 meshes with the gear 54 on the motor 39 whereas the gear 60 meshes with the gear 55 on the motor 40. The gear 59 meshes with the gear 50 whereas the gear 61 meshes with the gear 51.

Mounted on the shaft or spindle 43 by means of a bushing 62 is an operating arm 63. This arm is pinned to the spindle 43 and oscillates therewith. This arm carries a beveled gear 64 adapted to mesh with the beveled gears 52 and 53. The beveled gear 64 is freely rotatable on the arm 63 and is held in place by means of the nut 65.

Clamped to the shaft 43 and adapted to rotate therewith is a pair of commutators 66 and 67 respectively, which are insulated from the shaft 43 by the insulating bushings 48 and 49 respectively. The commutator 66 has an arcuate surface 68 while the commutator 67 has a corresponding surface 69.

Mounted on the panel 38 are the brushes 70, 71, 72, 73, 74, 75, 76, 77, 78, 79, 80 and 81. The brushes 71 to 75 are electrically connected respectively to the binding posts A1, A2, A3, A4 and A5. The brushes 77 to 81 are electrically connected respectively to the binding posts B1, B2, B3, B4 and B5. The binding posts M1, A1, A2, A3, A4, A5, M2, B1, B2, B3, B4 and B5 are electrically connected to the control apparatus illustrated in Figures 1 to 3 inclusive, as will hereinafter be described. It is to be noted that the arcuate surfaces 68 and 69 of the commutators 66 and 67 have staggered edges so that as the commutators rotate with the shaft 43, some or all of the brushes will be in contact with the commutators, depending upon the position of said commutators and the position of the shaft 43. This is shown in Figure 5 wherein four brushes are shown in contact and two brushes are shown out of contact with the surface 68 of the commutator 66. Likewise, four brushes are shown in contact and two brushes shown out of contact with the surface 69 of the commutator 67. The commutators and brushes above described constitute step-by-step operating and disconnecting switches.

The brush 70 is connected to the motor 39 whereas the brush 76 is connected to the motor 40. Binding posts M1 and M2 are connected to one side of the supply circuit. The wire 33, heretofore described as being connected to the binding post 23 is connected to the binding post M1 whereas the electrical connection 34, which is described as connected to the binding post 24, is connected to the binding post M2. The binding posts A1, A2, A3, A4 and A5 are respectively connected to contacts X1, X2, X3, X4 and X5 of the contact member 36, whereas the binding posts B1, B2, B3, B4 and B5 are respectively connected to the contacts Y1, Y2, Y3, Y4 and Y5 of the contact member 35 shown in Figure 2.

The circuit for the motor 40 is as follows:

From the source of supply through the binding post M2, the wire 34, the binding post 24, the contact 26, the contact 22 on the lever 19, the lead 32, the brush 30, the contact member 36 (Y1, Y2, Y3, Y4, Y5), the brushes 77, 78, 79, 80, 81, through the commutator 67, the brush 76 to the motor 40, and thence back to the source of supply.

The circuit for the motor 39 is correspondingly as follows:

From the source of supply through the binding post M1, through the lead 33 to the binding post 23, to the contact member 25, to the contact member 21 on the arm 19, through the lead 31 to the brush 29 and the contact members X1, X2, X3, X4 and X5 on the contact member 35, thence to the binding posts A1, A2, A3, A4 and A5 and the brushes 71, 72, 73, 74 and 75, through the commutator 66, through the brush 70, through the motor 39 back to the source of supply.

Mounted in the bushing 62 and extending in the opposite direction from the operating arm 63 is a short arm 82. The panel 38 is provided with two projecting members 83 and 84 which act as stops and which are adapted to engage the end of the arm 82 at either end of its travel and thereby limit the oscillation of the shaft 43 and the movement of the operating arm 63. The purpose of limiting the oscillation of the shaft 43 is to prevent the commutators 66 and 67 from being rotated to such an extent that none of the brushes are in contact with the commutators. It is necessary for the operation of this device that the two brushes 70 and 76 remain always in contact with the commutators 66 and 67 respectively. It will be obvious that when the commutator 66 has rotated so that brushes 71, 72, 73, 74, 75 are no longer in contact with the face 68, the brush 70 will be in contact. It is also obvious that all of the brushes 76 to 81 inclusive will be in contact with the face 69 of the commutator 67. The reverse is true when only brush 76 is in contact with the face 69 of the commutator 67. All of the brushes 70 to 75 inclusive will be in contact with the face 68 of the commutator 66.

The operation of the device is as follows:

The control apparatus, illustrated in Figure 2, is shown at rest at the predetermined temperature, for instance 70°. Upon a drop in temperature the gas pressure in the sylphon bellows 12 falls, permitting the bellows 12 to be compressed by the action of the spring 17 on the pin 14, pressing against the lever 7 and on the pin 13 of the sylphon bellows. This will cause the lever 7 carrying the lever 19 to move to the left. This movement of the lever 7 to the left will cause the upper part of the lever 19 to likewise swing to the left, to close the circuit through contacts 21 and 25. A very slight movement of the lever 7 is necessary to effectuate this since the lower portion of the lever 19 is frictionally held against movement by the brushes 29 and 30 resting on some one of the contact points 35 and 36. Thus, in Figure 2, the brushes 29 and 30 are shown resting on X3 and Y3. Contact having been made with the contact point 25, the circuit will be completed as follows:—From the source of supply through the binding post M1, through the wire 33, the binding post 23, the contact member 25, the contact member 21, the lead 31, the brush 29, the contact X3 of the contact member 35, through the electrical connection leading from X3 to the binding post A3, through the brush 73, through the commutator 66, the brush 70 to the motor 39, and thence back to the source of supply. The completion of this circuit will cause the motor 39 and its gear 54 to rotate and by means of the gears 58, 59, 50 and 52, cause the gear 64 to rotate on the operating arm 63. Since the motor 40 and its train of gears and the beveled gear 53 are stationary, the circuit lead to the motor 40 being broken, the beveled gear 53 will act as a rack and the rotation of the gear 64 on the operating arm 63 will cause the gear to descend the rack and lower the operating arm 63, thereby opening the dampers or increasing the fuel supply. The rocking of the shaft 43 will cause the brush 73 to ride off the commutator 66 as shown in Figure 5. This will break the circuit and cause the arm 63 to come to rest. Should the temperature continue to drop, the sylphon bellows 12 will be still further compressed by the action of the spring 17 and the lever 7 will swing still further to the left. Since the upper part of the lever 19, which is freely pivoted at 18 on the lever 7, is in contact with the contact member at 25, it can move no further to the left. This causes the lower part of the lever 19 carrying the brushes 29 and 30 to move to the left, so that the brush 29 will then engage the contact member X2 of the contact member 35. It will also cause the brush 30 to move over to the contact member Y4. Since the brush 72 is still in contact with the commutator 66, the motor will again begin operating and the arm 63 will be lowered another step. This movement will continue until the brush 72 runs off the curved portion 68 of the commutator 66. The motor 39 will then stop and there will be no further movement of the lever 63 unless the temperature continues to drop, in which event the contraction of the sylphon bellows 12 will permit the spring 17 to push the lever 7 still further to the left, causing the brushes 29 and 30 to ride over and engage the contact members X1 and Y5 respectively of the contacts 35 and 36. This will again start the motor and cause the lever 63 to fall to its maximum position, since the brush 71 will complete the circuit until it passes off the edge of the commutator, breaking the circuit. The arm 63, however, will be stopped from going beyond the maximum point by the engagement of the short arm 82 against the lug or stop 84.

The opening of the drafts and/or fuel supply will cause an increase in temperature. This will cause the apparatus to reverse. The increased temperature will cause the sylphon bellows 12 to expand compressing the spring 17, causing the lever 7 to move to the right. Since the lower end of the lever 19 is held against free movement by frictional engagement of the brushes 29 and 30 on the contact members 35 and 36, the upper part of the lever 19 will also move to the right, completing the circuit through the contact points 22 and 26. This will complete the circuit to the motor 40, through the brushes 76 and 81. This will cause the motor 40 to rotate, rotating the beveled gear 53. The beveled gear 52 being stationary acts as a rack and causes the lever 63 to ascend slightly, rocking the shaft 43. The rocking movement of the shaft 43 will cause the brush 81 to ride off the curved surface 69 of the commutator 67, and the fuel supply will be slightly reduced and/or drafts slightly closed. This closing of the fuel supply and/or drafts will continue step by step, the circuit being completed through the various brushes 80, 79, 78 and 77, as the brush 30 wipes across the contact members Y5, Y4, Y3, Y2 and Y1. It will be noted that once the regulation of the fuel and/or drafts has reached a point where the heat will be supplied at the predetermined temperatures, say 70°, the spring and the sylphon bellows will balance, thereby causing the contact members 21 and 22 to assume a median position between the contacts 25 and 26, breaking the circuit to both motors. In the normal operation of this device, the contacts will remain as shown in Figure 2, the only change being that as the temperature falls slightly contact will be made at 25 to increase the supply of heat, and when the bellows expand the contacts 21 and 22 will assume the median position where both circuits are broken. On the other hand, if the temperature increases slightly, contact will be made at 26 and the drafts or fuel supply will close slightly. The apparatus will continue this balancing or compensating effect thereby holding the temperature substantially constant. It will only cause the brushes 29 and 30 to be swung to the extreme point for operating the lever 63 to its extreme limits when there is an abnormal or decided change in temperature. Thus, it will be seen that the device is effective to open the fuel supply and/or drafts to cause the temperature to increase and yet operates to slowly close the drafts and/or fuel supply as the desired temperature is approached and then to hold the drafts and fuel supply at the point necessary to maintain the predetermined temperature. The device will balance between slightly opening and slightly closing the drafts or fuel as the temperature fluctuates. It will thus be seen that the reversing switches comprising the contacts 21, 25 and 22, 26 are adapted to be actuated or operated by the condition responsive means in advance of and independently of the actuation or operation of the step-by-step connecting switches comprising the contacts 29, 35 and 30, 36.

In operating valves for rubber calender rolls, the valves may be connected to the shaft 43 by means of gears so that the oscillation of the shaft 43 will cause the valves to be opened or closed the amount necessary to maintain the proper temperature in the rolls. Likewise, in operating ventilators the arm 63 may be utilized or gears may be attached at the ends 44, 45 of the shaft 43.

In operating the device to directly control pressure instead of temperatures, the sylphon bellows instead of being partly filled with volatile liquid, as is the usual practice, can be connected to the pressure line or directly connected to the steam boiler. The spring 17 would be adjusted to balance the steam pressure in the sylphon bellows 12 at the predetermined point. The operation will then be, as has been described, to increase or decrease the fuel supply the amount necessary to compensate for a drop or increase in pressure. It is obvious that the device will thereby maintain the pressure at substantially the predetermined point.

Figure 7 shows the invention installed to operate a household heating apparatus. A control or thermostat unit 90 is attached to a wall of a room in the usual manner and is connected by a multiple cable 91 to a motor unit 92. This motor unit may be located on the floor or on the side wall of the furnace room. The lever 63 is attached by a chain 93 to the damper control arm 94. The shaft 43 has attached to it a short lever 95 which may be utilized to operate an arm 96 adapted to control an oil or gas burner.

When the device is used for a coal burning heater the arm 63 and the damped connections may be used. When operating an oil or gas burner only the arm 95 and the connecting link 96 will be used since no dampers are necessary with these types of heaters.

A modified form of the invention employing a capacitor motor is illustrated in Figures 8, 9 and 10. Figures 8 and 9 show a modified form of the motor unit. Referring to Figure 8, the base 101 is provided with a removable cover 102. Mounted on the base 101 is a capacitor 103. A capacitor motor 104 is mounted on the base 101 on a standard or support 105. Brackets 106 and 107 are mounted on the base 101 and provide bearings for a shaft 108. Clamped to the shaft 108 and insulated therefrom by means of an insulating bushing 109 is a commutator 110. Mounted on the shaft 108 is a gear 111 which is adapted to engage with a worm 112. The worm 112 is mounted on a shaft 113, carried by a bearing block 114 secured to the base 101. At the opposite end of the shaft 113 is mounted a gear 115. This gear is adapted to mesh with a worm 116 mounted on the end of the shaft of the motor 104. The commutator 110 has an arcuate contact face 117. The face 117 is provided with stepped edges as is shown in Figure 9. Thirteen brushes A1, A2, A3, A4, A5, A6, D, C1, C2, C3, C4, C5 and C6 are secured to a support member 118, attached to the brackets 106 and 107. The motor being a capacitor motor is reversible and causes the shaft 108 to rotate either clockwise or counterclockwise in accordance with the operation of the thermostat or control unit. The contact of the various brushes on the commutator 110 is broken by the brushes running off the surface 117 at the various steps. It is to be noted that D is always in contact with the commutator, and either A6 or C1 are in contact.

The shaft 108 may be oscillated to the extent permitted by the commutator. The surface of the commutator may, where it is in contact with the brush D, be as great as 360°, in which case the shaft 108 can oscillate through 360°, but no further. As illustrated in Figures 8, 9 and 10, the shaft 108 can only oscillate 90°.

When it is desired that the operating means travel more than 360°, as when it is geared to a valve which may require several rotations of the valve stem to fully open and fully close the valve, the operating means may be attached to an extension of the shaft 113, or an intermediate shaft may be geared between the worm 112 and the gear 111, so that the worm 112 will drive an intermediate shaft, whereas the gear 111 will be driven by a gear on the intermediate shaft. Such an arrangement will permit several rotations of the operating means and yet keep the oscillation of shaft 108 to 360° or less, as desired.

A modified form of the thermostat or control unit is shown in Figure 10. This device is similar to the device shown in Figure 2 with the exception that the level 119 is a lever of the first-class. The power supply by the sylphon bellows and spring, (designated in Figure 2 as 12 and 17 respectively) is applied at the point 120 and 121. The lever 122 is pivoted to the lever 119 at 123, (just as the lever 19 is pivoted to the lever 7 in Figure 2). The lever 122 is provided with contact members 124 and 125 adapted to engage with the contact members 126 and 127 respectively. The lever 122 is provided with brushes or spring contact fingers 128 and 129. These brushes are connected to the contact points 124 and 125 by means of the leads 130 and 131. The brushes 128 and 129 are so positioned that the brush 128 is below the brush 129. These are adapted to engage a series of contacts 132 and 133. The faces of the contacts 133 are in a higher plane than the faces of the contacts 132. The capacitor 103 is attached to a line voltage shown as 110 volts. The motor 104 is a 23 volt motor. The operating circuit is as follows:

When contact is made between 124 and 126, the circuit will be through the line D to the brush D, to the commutator 110, to the brush A4, through the lead A4, to the contact 132 which is in contact with the brush 128, through the lead 130, to the contact 124, through the lead A to the motor which will be caused to rotate in the direction of the arrow marked A. When the lever 119 is moved to the right, causing the lever 122 to swing so that the point 125 is in contact with 127, the circuit will be from the capacitor 103 through the brush D, through the commutator 110, through the brush C4, through the line C4, through the brush 129 in contact with the contact points 133, through the lead 131 to the contact 125, the contact 127, through the lead C to the motor, causing the motor to rotate in the direction shown by the arrow C. The shaft, in each instance, will rotate in the direction shown by the arrows A and C corresponding to the circuit energized. The return from the motor to the capacitor is through the lead B. Operating levers or gears, not shown, to operate the dampers or fuel supply (corresponding to the lever 63, Figure 5) may be attached to the shaft 108.

From the above description it is evident that the invention is capable of many and varied uses and is particularly adapted to operate devices to compensate for varying conditions, being adapted to operate the device to its fullest capacity to compensate for widely fluctuating conditions or to balance or modulate the device for slight fluctuating conditions. It is also adapted to operate the device to its full capacity for wide fluctuations and reduce its capacity gradually as conditions approach normal. Whenever the word "condition" is used, it is understood to mean condition of temperature, pressure, humidity and the like.

While only two modifications of the device have been illustrated and described without intending to limit or restrict the invention to the exact construction shown, the device is capable of many other modifications within the scope of the invention as defined in the appended claims.

I claim:

1. A control device comprising condition responsive means, a first set of switches adapted to be operated by slight fluctuations in the condition responsive means, a second set of switches adapted to be connected in circuit with the first set of switches and operated by wider fluctuations in the condition responsive means, a motor device including operating means operatively connected to said switches, means for operating the motor device to correspond to the fluctuations in the condition responsive means.

2. A control device comprising condition responsive means, a first set of switches adapted to be operated by slight fluctuations in the condition responsive means, a second set of switches adapted to be connected in circuit with the first set of switches and operated by wider fluctuations in the condition responsive means, an operating device operatively connected to said switches, means for operating said operating device step by step with the fluctuations in the condition responsive means.

3. A control device comprising temperature responsive means, a first set of switches adapted to be operated by slight fluctuations in the temperature responsive means, a second set of switches adapted to be connected in circuit with the first set of switches and operated by wider fluctuations in the temperature responsive means, a motor device including operating means adapted to be connected to a device to be controlled operatively connected to said switches, means for moving the operating means step by step to respond to the variations in the temperature responsive means.

4. A control device comprising pressure responsive means, a first set of switches adapted to be operated by slight fluctuations in the pressure responsive means, a second set of switches adapted to be connected in circuit with the first set of switches and operated by wider fluctuations in the pressure responsive means, a motor device including operating means adapted to be connected to a device to be controlled operatively connected to said switches, means for moving the operating means step by step to respond to the variations in the pressure responsive means.

5. A control device comprising condition responsive means, a reversing switch mechanism adapted to be operated by slight variations in the condition responsive means, a step by step switch mechanism adapted to be operated by wider variations in the condition responsive means, said reversing switch mechanism being adapted to be operated independently of said step-by-step switch mechanism, a motor device including operating means adapted to be connected to a device to be controlled operatively connected to said switches, means for operating said operating means step by step to correspond to the operation of said switches.

6. A control device comprising temperature responsive means, a reversing switch mechanism adapted to be operated by slight variations in the temperature responsive means, a step-by-step switch mechanism adapted to be operated by wider variations in the temperature responsive means, said reversing switch mechanism being adapted to be operated independently of said step-by-step switch mechanism, a motor device including operating means adapted to be connected to a device to be controlled operatively connected to said switches, means for operating said operating means step by step to correspond to the operation of said switches.

7. A control device comprising pressure responsive means, a reversing switch mechanism adapted to be operated by slight variations in the pressure responsive means, a step-by-step switch mechanism adapted to be operated by wider variations in the pressure responsive means, said reversing switch mechanism being adapted to be operated independently of said step-by-step switch mechanism, a motor device including operating means adapted to be connected to a device to be controlled operatively connected to said switches, means for operating said operating means step by step to correspond to the operation of said switches.

8. A control device comprising condition responsive means, a first set of switches adapted to be operated by slight fluctuations in the condition responsive means, a second set of switches adapted to be connected in circuit with the first set of switches and operated by wider fluctuations in the condition responsive means, a motor device including operating means adapted to be connected to a device to be controlled operatively connected to said switches, means for moving the operating means to compensate for variations in condition, and means for varying the operating means as the conditions approach normal.

9. A control device comprising condition responsive means, a reversing switch mechanism adapted to be operated by slight variations in the condition responsive means, a step-by-step switch mechanism adapted to be operated by wider fluctuations in the condition responsive means, said reversing switch mechanism being adapted to be operated independently of said step-by-step switch mechanism, a motor device including operating means adapted to be connected to a device to be controlled operatively connected to said switches, means for operating said operating means to the maximum capacity, and means to return said operating means step by step to its normal position as conditions tend to approach normal.

10. A control device comprising a lever, condition responsive means operatively connected to one end of said lever, two sets of contact members carried by said lever, contact members adapted to contact with one set of contact members on said lever, a series of contact members adapted to contact with the other set of contacts on said lever, a motor mechanism comprising a shaft, an electric motor adapted to operate said shaft, a commutator carried on said shaft, a series of brushes for said commutator each respectively connected electrically with one of the series of contact members, and an operating member connected to said shaft adapted to assume varying operating positions in response to the variations in the condition responsive means.

11. A control device comprising a lever, condition responsive means operatively connected to one end of said lever, a second lever pivoted on the opposite end of the first lever, a set of contact members carried by one end of the second lever, a second set of contact members carried on the opposite end of said second lever, contact members adapted to contact with the first set of contact members and a series of contact members adapted to contact with the second set of contact members, a motor mechanism comprising a shaft, an electric motor geared to said shaft, a commutator carried on said shaft, a series of brushes for said commutator electrically connected with said series of contact members, an operating member connected to said shaft adapted to assume varying operating positions in response to the variations in the condition responsive means.

12. A control device comprising a lever, a sylphon bellows operatively connected to one end of said lever, yieldable means opposing the action of said sylphon bellows, a second lever pivoted on the opposite end of the first lever, a set of contact members carried by one end of said second lever, a second set of contact members carried on the opposite end of said second lever, contact members adapted to contact with the first set of contact members and a series of contact members adapted to contact with the second set of contact members, a motor mechanism comprising a shaft, an electric motor geared to said shaft, a commutator carried on said shaft, a series of brushes for said commutator electrically connected with said series of contact members, an operating member connected to said shaft adapted to assume varying operating positions in response to the expansion or contraction of the sylphon bellows.

13. A control device comprising a lever, a sylphon bellows operatively connected to said lever, a resilient member opposing the action of said sylphon bellows, a second lever pivoted on the first lever, a set of contact members carried by one end of the second lever, a second set of contact members carried on the opposite end of said second lever, contact members adapted to contact with the first set of contact members and a series of contacts adapted to contact with the second set of contact members, a motor mechanism comprising a shaft, an electric motor operatively connected to said shaft, a commutator carried on said shaft, a series of brushes for said commutator electrically connected with said series of contact members, and an operating member operatively connected to said motor to assume varying operating positions in response to the expansion or contraction of the sylphon bellows.

14. A control device comprising a reversible motor means adapted to be operatively connected to a condition changing means, condition responsive means, and connections between the condition responsive means and the reversible motor means adapted to cause said reversible motor means to function regardless of the speed and distance of movement in either direction of the condition responsive means.

15. A control device comprising a reversible motor means adapted to be operatively connected to a condition changing means, condition responsive means, reversing switches and connecting switches adapted to be actuated by the condition responsive means, and operating and disconnecting switches for the reversible motor means adapted to have connection with the reversing switches and connecting switches, a sufficient number of said operating and disconnecting switches being in closed position to cause said reversible motor means to function regardless of the speed and distance of movement in either direction of the condition responsive means.

16. A control device comprising a reversible motor means adapted to be operatively connected to a condition changing means, condition responsive means, reversing switches adapted to be actuated by the condition responsive means, step-by-step connecting switches adapted to be successively actuated by the condition responsive means, and step-by-step operating and disconnecting switches for the reversible motor means adapted to have connection with the reversing switches and connecting switches and to have step-by-step movement corresponding to any step-by-step actuation of the connecting switches, a sufficient number of said operating and disconnecting switches being in closed position to cause said reversible motor means to function regardless of the speed and distance of movement in either direction of the condition responsive means.

17. A control device comprising a reversible motor means adapted to be operatively connected to a condition changing means, condition responsive means, two reversing switches adapted to be actuated by the condition responsive means, step-by-step connecting switches adapted to be successively actuated by the condition responsive means, and two sets of reversible, step-by-step operating and disconnecting switches for the reversible motor means, each set being adapted to be connected to a corresponding reversing switch and to the connecting switches and to have step-by-step movement in either of opposite directions depending on which reversing switch is actuated and corresponding to any step-by-step actuation of the connecting switches, the two sets of operating and disconnecting switches being so constructed that they are operable to cause the motor means to be actuated step by step in either of opposite directions, the switches of one set being successively opened to disconnect the motor means during its step-by-step actuation in one direction, while the switches of the other set are correspondingly successively and additively closed whereby said reversible motor means will function regardless of the speed and distance of movement in either direction of the condition responsive means.

18. A control device comprising a reversible motor means adapted to be operatively connected to a condition changing means, condition responsive means, two reversing switches adapted to be actuated by the condition responsive means, two sets of step-by-step connecting switches adapted to be successively actuated by the condition responsive means and two sets of reversible step-by-step operating and disconnecting switches for the reversible motor means, each set of operating and disconnecting switches being adapted to be connected to a corresponding reversing switch and to a corresponding set of connecting switches and to have step-by-step movement in either of opposite directions depending on which reversing switch is actuated and corresponding to any step-by-step actuation of the connecting switches, the two sets of operating and disconnecting switches being so constructed that they are operable to cause the motor means to be actuated step-by-step in either of opposite directions, the switches of one set being successively opened to disconnect the motor means during its step-by-step actuation in one direction, while the switches of the other set are correspondingly successively and additively closed whereby said reversible motor means will function regardless of the speed and distance of movement in either direction of the condition responsive means.

19. A control device comprising a reversible motor means adapted to be operatively connected to a condition changing means, a lever pivoted intermediate its ends, condition responsive means operatively connected to said lever, reversing switches adapted to be electrically connected to the reversible motor means and actuated by one end of said lever, and connecting switches adapted to be electrically connected to the reversible motor means and actuated by the other end of said lever.

20. A control device comprising a reversible motor means adapted to be operatively connected to a condition changing means, a lever pivoted intermediate its ends, condition responsive means operatively connected to said lever, two reversing switches adapted to be electrically connected to the reversible motor means and actuated by one end of said lever, and two sets of connecting switches adapted to be electrically connected to the reversible motor means and actuated by the other end of said lever, each reversing switch being electrically connected to its corresponding set of connecting switches.

21. A control device comprising a reversible motor means adapted to be operatively connected to a condition changing means, a lever pivoted intermediate its ends, condition responsive means operatively connected to said lever, two reversing switches adapted to be electrically connected to the reversible motor means and actuated by one end of said lever, and two sets of connecting switches adapted to be electrically connected to the reversible motor means and actuated by the other end of said lever, each reversing switch being electrically connected to its corresponding set of connecting switches, the construction being such that when the condition responsive means moves the lever in one direction one reversing switch is closed to complete the circuit to the reversible motor means through a switch of one set of connecting switches and the other reversing switch is opened to break the circuit to the reversible motor means through the other set of connecting switches, and vice versa.

22. A control device comprising a reversible motor means adapted to be operatively connected to a condition changing means, two reversing switches adapted to be electrically connected to the reversible motor means, two sets of connecting contacts adapted to be electrically connected to the reversible motor means, a member carrying two connecting contacts, each of which is adapted to successively make connection with the contacts of its corresponding set of connecting contacts, and condition responsive means operatively connected to said member and adapted to actuate said reversible switches independently of said connecting means, the construction being such that when the condition responsive means successively moves the member but slightly in opposite directions, first one reversing switch is closed to actuate the reversible motor means in one direction and the other reversing switch is opened, and then said one reversing switch is opened and said other reversing switch is closed to reverse the reversible motor means, all without disconnecting whatever connecting switches happen to be closed at the time, and when the member is given a considerable movement in either of opposite directions, first a reversing switch is closed and then on further movement of the member in the same direction, each connecting contact on the member successively makes connection with the contacts of its corresponding set of contacts.

23. A control device comprising a reversible motor means adapted to be operatively connected to a condition changing means, condition responsive means, connecting switches adapted to be electrically connected to the reversible motor means and to be actuated by the condition responsive means, and reversing switch means adapted to be electrically connected to the reversible motor means and to be actuated by the condition responsive means independently of actuation of the connecting switches, to reverse the reversible motor means.

24. A control device comprising a reversible motor means adapted to be operatively connected to a condition changing means, condition responsive means, connecting switches adapted to be electrically connected to the reversible motor means and to be actuated by the condition responsive means, and reversing switch means adapted to be electrically connected to the reversible motor means and to be actuated by the condition responsive means in advance of actuation of the connecting switches, to reverse the reversible motor means.

25. A control device comprisng a reversible motor means adapted to be operatively connected to a condition changing means, condition responsive means, connecting switches adapted to be electrically connected to the reversible motor means and to be actuated by the condition responsive means, and reversing switch means adapted to be electrically connected to the reversible motor means and to be actuated by the condition responsive means without disconnecting whatever connecting switch happens to be connected to the reversible motor means, to reverse the reversible motor means.

26. A control device comprising a reversible motor means adapted to be operatively connected to a condition changing means, condition responsive means, two sets of connecting switches adapted to be electrically connected to the reversible motor means and to be actuated by the condition responsive means, and reversing switch means adapted to be electrically connected to the reversible motor means through one or the other of the two sets of connecting switches and to be actuated by the condition responsive means in advance of actuation of the connecting switches, to reverse the reversible motor means.

27. A control device comprising a reversible motor means adapted to be operatively connected to a condition changing means, condition responsive means movable in opposite directions, two sets of connecting switches adapted to be electrically connected to the reversible motor means, reversing switch means adapted to be electrically connected to the reversible motor means and to be actuated by the condition responsive means to reverse the reversible motor means, the construction being such that when the condition responsive means successively moves but slightly in opposite directions, the reversing switch means is successively actuated to successively reverse the reversible motor means, all without disconnecting whatever connecting switches happen to be closed at the time, and when the condition responsive means moves a considerable distance in either of opposite directions, the reversing switch means is first actuated to reverse the reversible motor means and then on further movement of the condition responsive means in the same direction certain of the connecting switches are actuated.

28. A control device comprising a reversible motor means adapted to be operatively connected to a condition changing means, condition responsive means, operating and disconnecting switches adapted to be electrically connected to the reversible motor means, connecting switches adapted to be electrically connected to the reversible motor means and to be actuated by the condition responsive means, and reversing switch means adapted to be electrically connected to the reversible motor means and to be actuated by the condition responsive means in advance of actuation of the connecting switches, to reverse the reversible motor means.

29. A control device comprising a reversible motor means adapted to be operatively connected to a condition changing means, condition responsive means, operating and disconnecting switches adapted to be electrically connected to the reversible motor means, connecting switches adapted to be electrically connected to the reversible motor means and to be actuated by the condition responsive means, and reversing switch means adapted to be electrically connected to the reversible motor means and to be actuated by the condition responsive means without disconnecting whatever connecting switch happens to be connected to the reversible motor means, to reverse the reversible motor means.

30. A control device comprising condition responsive means, a first set of switches, a first means operating said switches in response to slight reversals in movement of said condition responsive means, a second set of switches, means independent of said first means operating said second set of switches in response to continued movement of said condition responsive means in either direction, condition control means, and means controlled by said switches for operating said condition control means.

31. A control device comprising condition control means, condition responsive means, and operating means actuated by said condition responsive means and controlling the operation of said condition control means, said operating means being adapted to cause a change in said condition control means up to its maximum capacity in response to a sudden wide change of said condition responsive means and to progressively restore said condition control means to normal as the condition responsive means approaches normal.

32. A control device comprising a reversible motor means adapted to be operatively connected to a condition changing means, a pivoted lever, condition responsive means operatively connected to said lever, reversing switches, and step-by-step switches connected to said reversible motor means, said reversing switches being actuated by slight reversals in movement of said lever prior to actuation of said step-by-step switches and independently of the position of said step-by-step switches, said step-by-step switches being progressively actuated in response to continued movement of said lever in either direction.

33. A control device comprising a lever, condition responsive means operatively connected to said lever, two sets of contact members carried by said lever, contact members adapted to contact with one set of contact members on said lever, a series of contact members adapted to contact with the other set of contacts on said lever, a motor mechanism comprising a shaft, an electric motor adapted to operate said shaft, a commutator carried on said shaft, a series of brushes for said commutator, each respectively connected electrically with one of the series of contact members, and an operating member connected to said shaft adapted to assume varying operating positions in response to the variations in the condition responsive means.

34. A control device comprising a reversible motor means adapted to be operatively connected to a condition changing means, a first pivoted lever, condition responsive means operatively connected to said lever, a second pivoted lever controlled by said first lever, a reversing switch, and connecting switches connected to said reversible motor means, said reversing switch being actuated by said second lever in response to reversals of said condition responsive means and said connecting switches being actuated by one of said levers in response to continued movement of said condition responsive means in either direction.

35. A control device comprising a reversible motor means adapted to be operatively connected to a condition changing means, a pivoted lever, condition responsive means adapted to actuate said lever, a second lever actuated by said first lever, a double-throw switch actuated by said second lever in response to reversals in movement of said condition responsive means, a step-by-step switch, and means actuating said step-by-step switch by one of said levers in response to continued movement of said condition responsive means in either direction.

36. A control device comprising a reversible motor means adapted to be operatively connected to a condition changing means, a pivoted lever, condition responsive means adapted to actuate said lever, a second lever actuated by said first lever, a double-throw switch actuated by said second lever, a pair of step-by-step switches connected respectively to the poles of said double-throw switch, and means controlled in accordance with the position of one of said levers for actuating both of said step-by-step switches.

37. A control device comprising a reversible motor means adapted to be operatively connected to a condition changing means, a pivoted lever, condition responsive means adapted to actuate said lever, a second lever actuated by said first lever, a double-throw switch, a step-by-step switch, and means whereby said second lever independently actuates both of said switches.

In testimony whereof, I have affixed my signature to this specification.

HAZOR J. SMITH.

CERTIFICATE OF CORRECTION.

Patent No. 1,896,207. February 7, 1933.

HAZOR J. SMITH.

It is hereby certified that error appears in the printed specification of the above numbered patent requiring correction as follows: Page 9, line 128, claim 22, for "reversible" read "reversing", and line 129, for "means" read "contacts"; and that the said Letters Patent should be read with these corrections therein that the same may conform to the record of the case in the Patent Office.

Signed and sealed this 28th day of February, A. D. 1933.

M. J. Moore, (Seal) Acting Commissioner of Patents.